US011389881B2

(12) United States Patent
 Chen

(10) Patent No.: US 11,389,881 B2
(45) Date of Patent: Jul. 19, 2022

(54) ANGLE HEAD HOLDER

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 50 days.

(21) Appl. No.: 17/142,455

(22) Filed: Jan. 6, 2021

(65) Prior Publication Data
 US 2021/0316372 A1  Oct. 14, 2021

(30) Foreign Application Priority Data

Apr. 8, 2020  (TW) .................................. 109111708

(51) Int. Cl.
 *B23B 31/20* (2006.01)
 *B23Q 5/04* (2006.01)
 *B23B 31/11* (2006.01)
(52) U.S. Cl.
 CPC ...... *B23B 31/207* (2013.01); *B23B 31/20125* (2021.01); *B23Q 5/045* (2013.01); *B23B 31/1107* (2013.01)

(58) Field of Classification Search
 CPC ............ B23B 31/207; B23B 31/20125; B23B 31/1107; B23B 31/265; B23B 31/201; B23B 31/2012; B23B 2260/022; B23Q 5/045; B23Q 3/12
 See application file for complete search history.

(56) References Cited

U.S. PATENT DOCUMENTS

| 6,293,172 B1 * | 9/2001 | Smith | ..................... B25B 23/18 81/177.2 |
| 8,262,095 B2 * | 9/2012 | Chen | ..................... B23B 31/201 408/239 R |

FOREIGN PATENT DOCUMENTS

CN  201333537 Y * 10/2009 ......... B23B 31/1253

* cited by examiner

*Primary Examiner* — Boyer D Ashley
*Assistant Examiner* — Reinaldo A Vargas Del Rio
(74) *Attorney, Agent, or Firm* — WPAT, PC

(57) ABSTRACT

An angle head holder has a steering assembly and a holder assembly rotatably mounted in the steering assembly. The holder assembly has a cutter spindle, a threaded rod, multiple balls, and a collet. The cutter spindle has a central hole and a first annular groove radially formed in the central hole at a position near a rear end of the cutter spindle. The threaded rod has a second annular groove aligning with the first annular groove to form a ball groove between the threaded rod and the cutter spindle. The balls are arranged in the ball groove. The collet is inserted in the central hole of the cutter spindle from a front end of the cutter spindle and is connected to the threaded rod with threaded connection.

8 Claims, 6 Drawing Sheets

ANGLE HEAD HOLDER

BACKGROUND OF THE INVENTION

1. Field of the Invention

The present invention relates to a cutter holder for a machining tool, and more particularly to an angle head holder for easily detaching a cutter.

2. Description of Related Art

A conventional angle head holder is an accessory for a machining tool, which is applied to change a machining direction of the machining tool.

The conventional angle head has a steering assembly and a holder assembly. The steering assembly substantially has a base and a driving shaft. The driving shaft is rotatably mounted in the base, is connected with a spindle of the machining tool, and is driven to spin by the spindle of the machining tool. The holder assembly is rotatably mounted in the base and connected to the driving shaft via a steering transmission mechanism. An angle is formed between an axil direction of the holder assembly and an axil direction of the driving shaft. The holder assembly is driven to spin by the driving shaft.

The holder assembly substantially has a cutter spindle, a collet, and a fastener. The cutter spindle is connected to the driving shaft by the steering transmission mechanism and has a central hole axially formed through the cutter spindle. The collet is used to clamp a cutter and is inserted in a front of the central hole of the cutter spindle. The collet has a thread hole formed in a rear thereof. The fastener is inserted in the central hole of the cutter spindle from a rear thereof and connected with the thread hole of the collet by a threaded connection. Thus, the collet can be firmly mounted in the cutter spindle.

To detach the collet from the cutter spindle, the fastener is driven to rotate and move backwardly to loosen the threaded connection between the fastener and the collet by a tool. After the fastener is detached, the collet is kept in the cutter spindle. A knocking to the rear of the collet is needed for pushing the collet out from the cutter spindle. The detachment of the collet is inconvenient, and the rear of collet may be broken easily after a long-term knocking.

To overcome the shortcomings, the present invention tends to provide an angle head holder assembly to mitigate or obviate the aforementioned problems.

SUMMARY OF THE INVENTION

The main objective of the invention is to provide an angle head holder and a collet of the angle head holder can be detached easily.

The angle head holder has a steering assembly and a holder assembly. The steering assembly has a base and a driving shaft rotatably mounted in the base. The holder assembly is rotatably mounted in the base at an angle formed between an axial direction of the holder assembly and an axial direction of the driving shaft. The holder assembly is connected to the driving shaft with a steering transmission unit and has a cutter spindle, a threaded rod, multiple balls, and a collet. The cutter spindle has a front end, a rear end, a central hole axially formed through the cutter spindle, and a first annular groove radially recessed in the central hole of the cutter spindle at a position near the rear end of the cutter spindle. The threaded rod is mounted through the central hole of the cutter spindle and has a second annular groove radially recessed in the threaded rod and aligning with the first annular groove to form an annular ball groove between the threaded rod and the cutter spindle. The balls are mounted in and arranged in the ball groove. The collet is inserted in the central hole of the cutter spindle from the front end of the cutter spindle and is connected to the threaded rod with a threaded connection.

Other objects, advantages and novel features of the invention will become more apparent from the following detailed description when taken in conjunction with the accompanying drawings.

DETAILED DESCRIPTION OF PREFERRED EMBODIMENT

Figure 1:
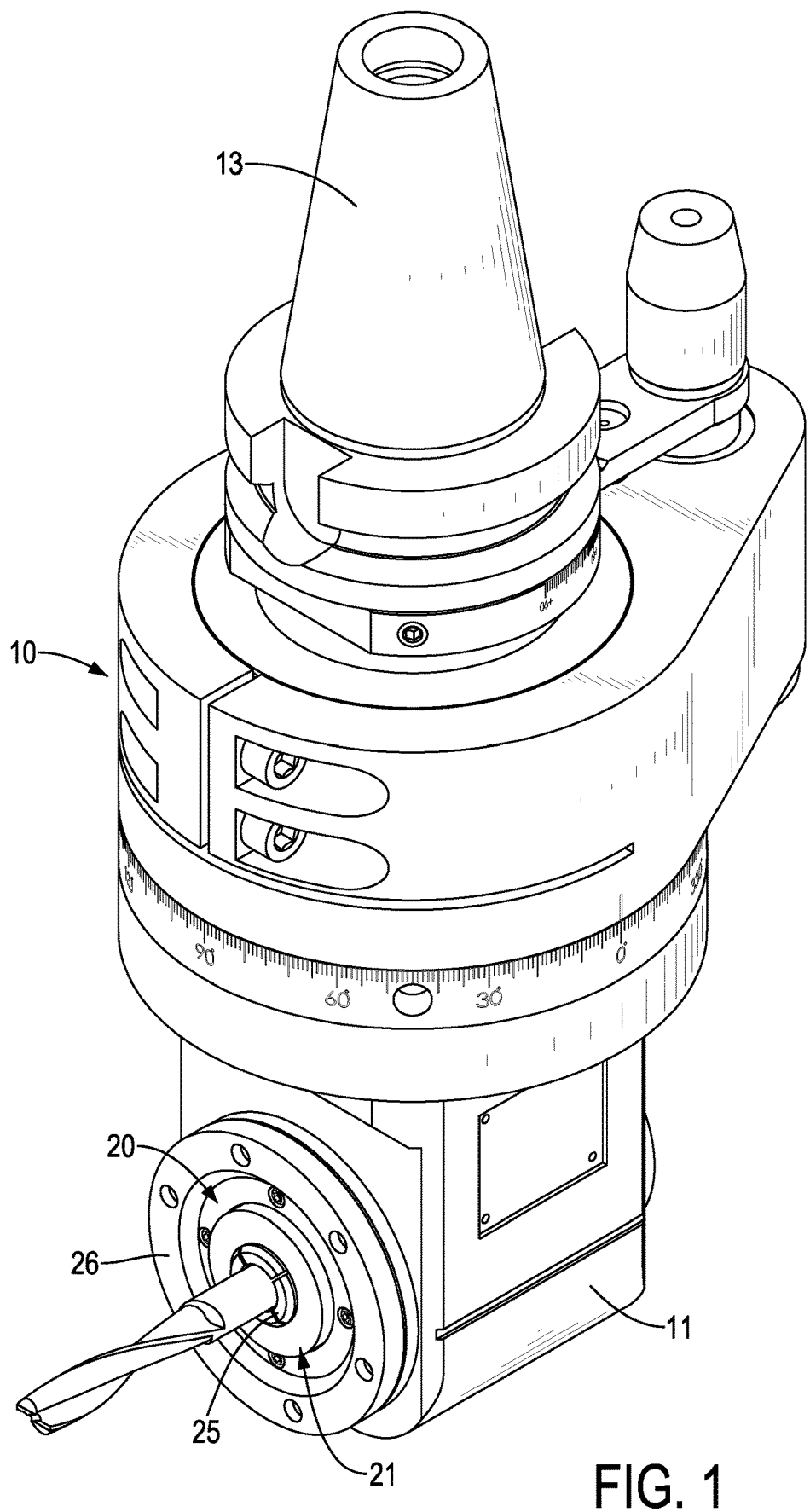
FIG. 1 is a perspective view of an angle head holder in accordance with the present invention.
Figure 2:
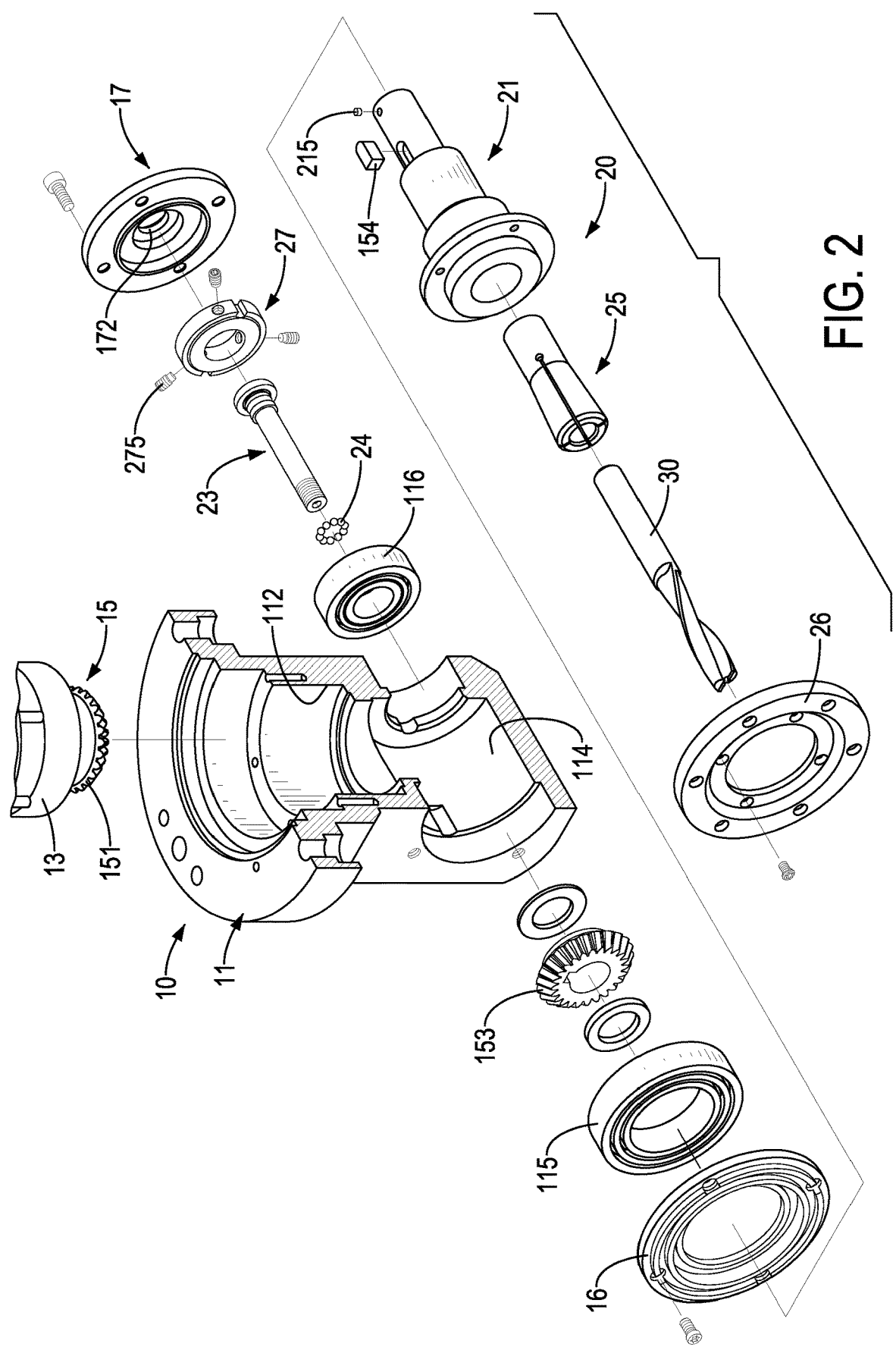
FIG. 2 is an exploded perspective view in partial section of the angle head holder in FIG. 1.
Figure 3:
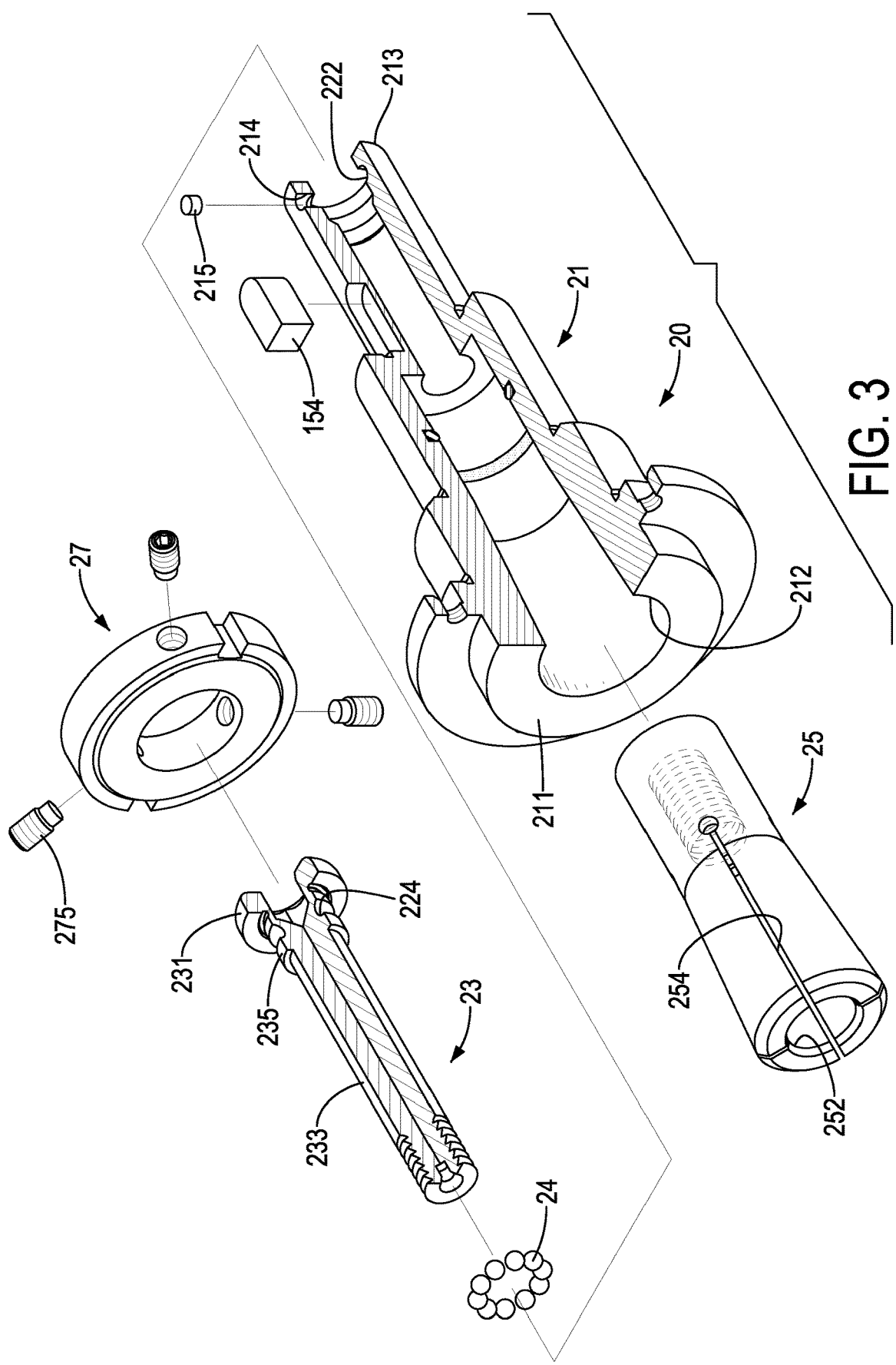
FIG. 3 is an enlarged exploded perspective view in partial section of the holder assembly of the angle head holder in FIG. 2.
Figure 4B:
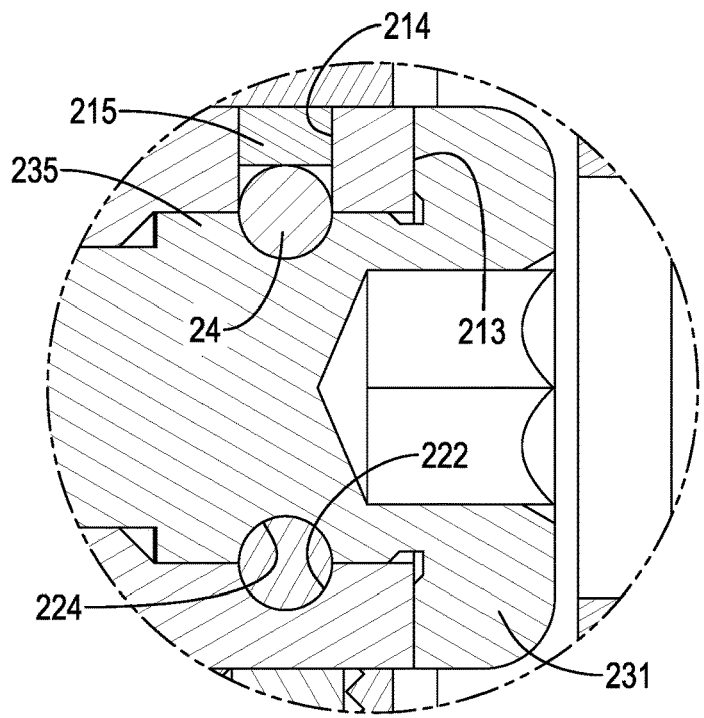
FIG. 4B is a further enlarged cross sectional side view of the angle head holder in FIG. 4A.
Figure 4A:
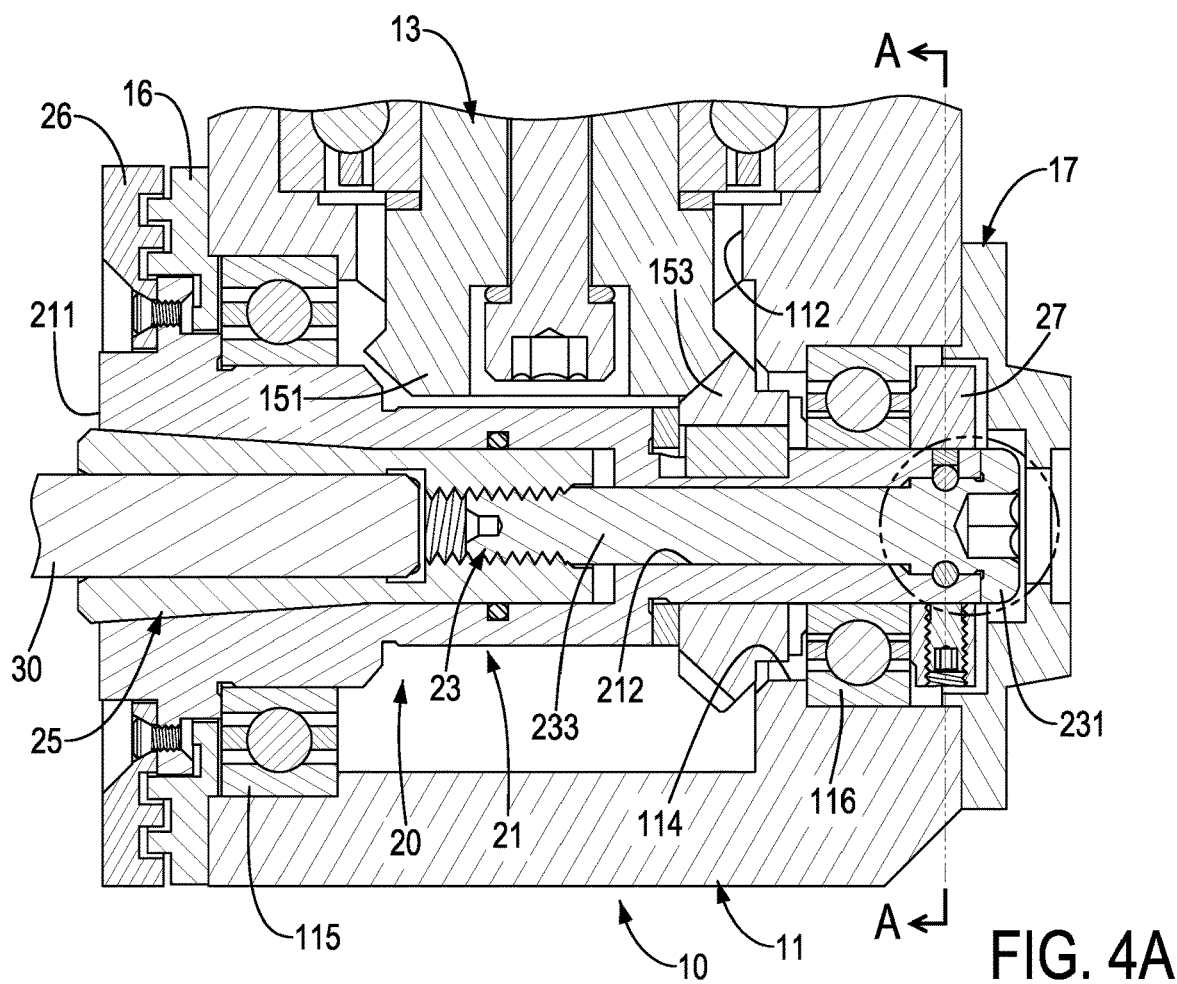
FIG. 4A is an enlarged cross sectional side view of the angle head holder in FIG. 1.
Figure 5:
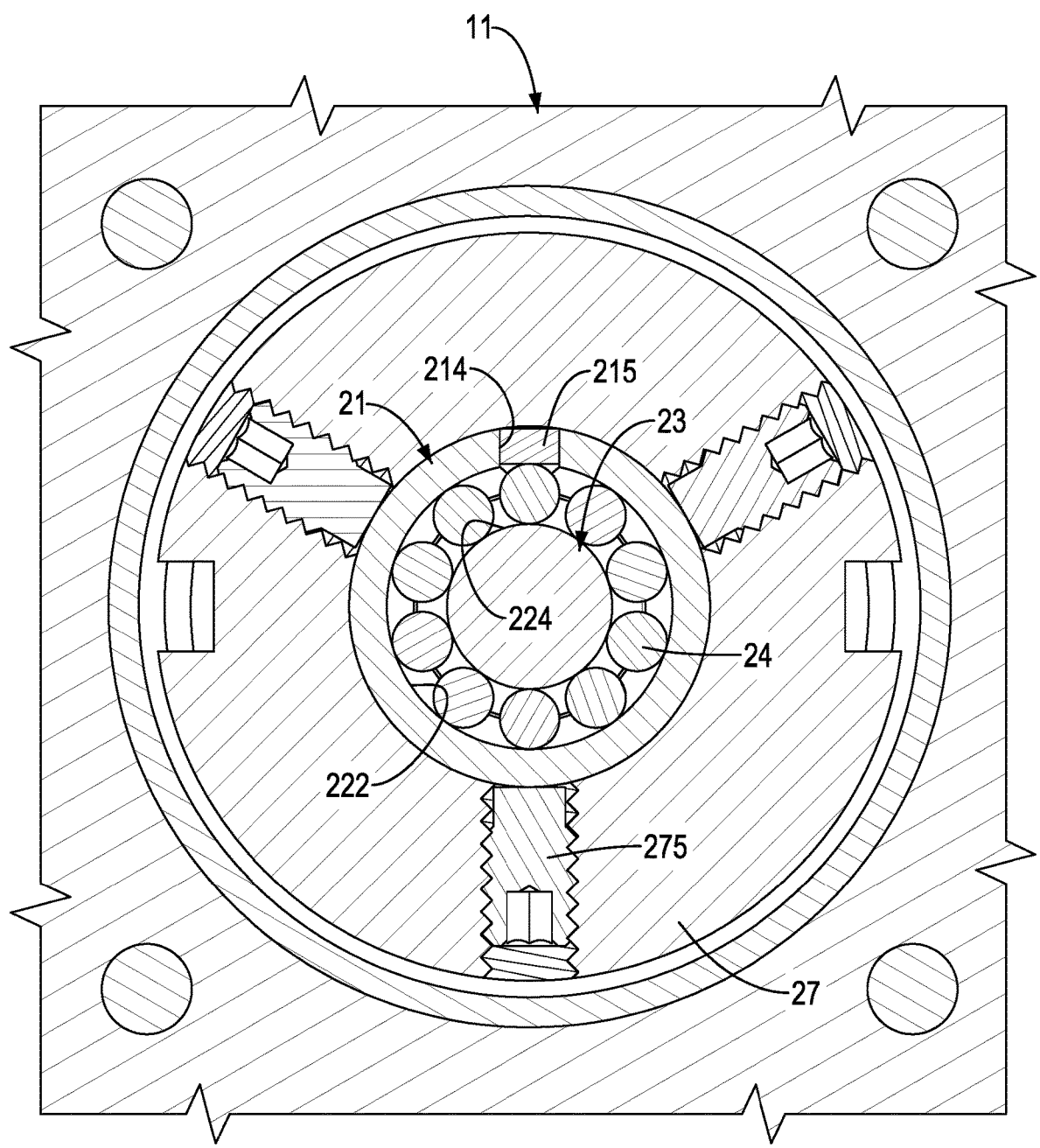
FIG. 5 is an enlarged cross sectional end view of the angle head holder along a line A-A in FIG. 4.

With reference to FIGS. 1, 2, 4A, and 4B, an embodiment of an angle head holder in accordance with the present invention has a steering assembly 10 and a holder assembly 20.

The steering assembly 10 has a base 11 and a driving shaft 13. The driving shaft 13 is rotatably mounted in the base 11, is used to connect with a spindle of a machining tool, and is driven to spin by the spindle of the machining tool.

The holder assembly 20 is rotatably mounted in the base 11 at an angle formed between an axial direction of the holder assembly 20 and an axial direction of the driving shaft 13, is connected to the driving shaft 13 with a steering transmission unit 15, and is driven to spin by the driving shaft 13.

The holder assembly 20 has a cutter spindle 21, a threaded rod 23, multiple balls 24, and a collet 25.

The cutter spindle 21 is connected to the driving shaft 13 with the steering transmission unit 15 at a position below the driving shaft 13. In the embodiment, the steering transmission unit 15 is a bevel gear assembly and has a first bevel gear 151 and a second bevel gear 153 engaged with each other. The first bevel gear 151 is mounted on a bottom end of the driving shaft 13. The second bevel gear 153 surrounds the cutter spindle 21. The cutter spindle 21 and the second bevel gear 153 are connected to each other with a key 154 mounted between the cutter spindle 21 and the second bevel gear 153. The cutter spindle 21 has a keyseat recessed in an outer surface thereof, and the second bevel gear 153 has a corresponding keyway recessed in an inner surface thereof. The key 154 is mounted in the keyseat and the corresponding keyway to lock the second bevel gear 153 with the cutter spindle 21.

The base 11 has a first axial hole 112 recessed therein from a top of the base 11 and a second axial hole 114 transversally formed through the base 11 at a position near a bottom of the base 11 and communicating with the first axial hole 112. The driving shaft 13 is rotatably inserted in the first axial hole 112 of the base 11. The cutter spindle 21 is rotatably inserted in the second axial hole 114 of the base 11. The angle formed between the axial direction of the cutter spindle 21 of the holder assembly 20 and the axial direction of the driving shaft 13 is 90 degrees. A front bearing 115 is mounted in a front of the second axial hole 114 and a rear bearing 116 is mounted in a rear of the second axial hole 114. The cutter spindle 21 is inserted in the front bearing 115 and the rear bearing 116, and is driven to spin by the driving shaft 13.

With reference to FIGS. 2 to 5, the cutter spindle 21 has a front end 211, a rear end 213, a central hole 212, and a first annular groove 222. The rear end 213 is opposite to the front end 211. The central hole 212 is axially formed through the cutter spindle 21 from the front end 211 to the rear end 213 of the cutter spindle 21. The first annular groove 222 is radially recessed in an inner surface of the central hole 212 of the cutter spindle 21 at a position near the rear end 213 of the cutter spindle 21.

The threaded rod 23 is mounted in the central hole 212 of the cutter spindle 21. The threaded rod 23 has a second annular groove 224 radially recessed in the threaded rod 23 and aligning with the first annular groove 222 to form an annular ball groove between the threaded rod 23 and the cutter spindle 21. Furthermore, the ball groove is formed by the first annular groove 222 and the second annular groove 224. The balls 24 are mounted in and arranged in the ball groove. The threaded rod 23 has a head 231 and a rod body 233. The head 231 is adjacent to the rear end 213 of the cutter spindle 21. The head 231 has a socket recessed in an end surface of the head 231 for a tool mounted therein to rotate the threaded rod 23. The rod body 233 protrudes from the head 231 toward the front end 211 of the cutter spindle 21. The rod body 233 has an external thread formed around the rod body 233. The external thread may be formed around a partial segment of the rod body 233. In the embodiment, the external thread is formed around a segment of the rod body 233 away from the head 231. The second annular groove 224 is recessed in the outer surface of the threaded rod 23 at a position near the head 231. A flange 235 radially protrudes from the rod body 233 at a segment of the rod body 233 near the head 231 and aligning with the first annular groove 222, and the second annular groove 224 is radially recessed in an outer surface of the flange 235.

The collet 25 is inserted in the central hole 212 of the cutter spindle 21 from the front end 211 of the cutter spindle 21. The collet 25 is connected to the threaded rod 23 with a threaded connection. The collet 25 has a clamping hole 252 and multiple slits 254. The clamping hole 252 is axially formed through the collet 25 and has an internal thread formed around a segment of the clamping hole 252 near the threaded rod 23. The internal thread of the collet 25 is connected with the external thread of the threaded rod 23. The slits 254 are arranged around and communicate with the clamping hole 252. The slits 254 are applied to provide flexible spaces for the collet 25 to clamp the cutter 30. Preferable, the collet 25 has diameters gradually larger toward an end of the collet 25 away from the threaded rod 23 to form a cone. The central hole 212 of the cutter spindle 21 has a collet recess formed in a segment of the central hole 212 near the front end 211 of the central hole 212 and corresponding to the collet 25 in shape and position. The collet 25 is mounted in the collet recess of the cutter spindle 21.

Preferably, the cutter spindle 21 has an inserting hole 214 radially recessed in the outer surface of the cutter spindle 21 and aligning with and communicating with the first annular groove 222. A diameter of the inserting hole 214 is slightly larger than a diameter of each of the balls 24. After the second annular groove 224 of the threaded rod 23 aligns with the first annular groove 222, the balls 24 can be inserted into the ball groove via the inserting hole 214 to engage the threaded rod 23. A plug 215 is mounted in the inserting hole 214 to prevent the balls 24 falling off from the ball groove. The plug 215 may be a flexible member.

Preferably, a tightening block 27 surrounds the outer surface of the cutter spindle 21. The tightening block 27 has multiple abutting screws 275 mounted in the tightening block 27 and arranged around the tightening block 27 at angular intervals. The abutting screws 275 are connected to the tightening block 27 with threaded connections and abut against the outer surface of the cutter spindle 21 to fix a position of the tightening block 27. An end of the tightening block 27 abuts against the rear bearing 116 to limit a position of the rear bearing 116. The tightening block 27 covers the inserting hole 214 of the cutter spindle 21 to prevent the plug 215 and the balls 24 falling off from the cutter spindle 21 while the cutter spindle 21 is spinning.

The base 11 has a rear cover 17 covering an opening of the second axial hole 114 formed in the rear of the base 11 and fixed on the base 11. The rear cover 17 has a through hole 172 axially formed through the rear cover 17 for a tool inserted through the through hole 172 to rotate the threaded rod 23.

The base 11 has a front ring 16 covering the opening of the second axial hole 114 formed in the front of the base 11 and fixed on the base 11 to limit a position of the front bearing 115. The cutter spindle 21 has a flange radially protruded from the outer surface near the front end 211 thereof and at a front of the front ring 16. A front cover 26 is fixed on a front of the flange of the cutter spindle 21, and covers the front of the front ring 16 at a spaced interval. The front cover 26 rotates relative to the front ring 16 and covers the front ring 16.

Figure 6:
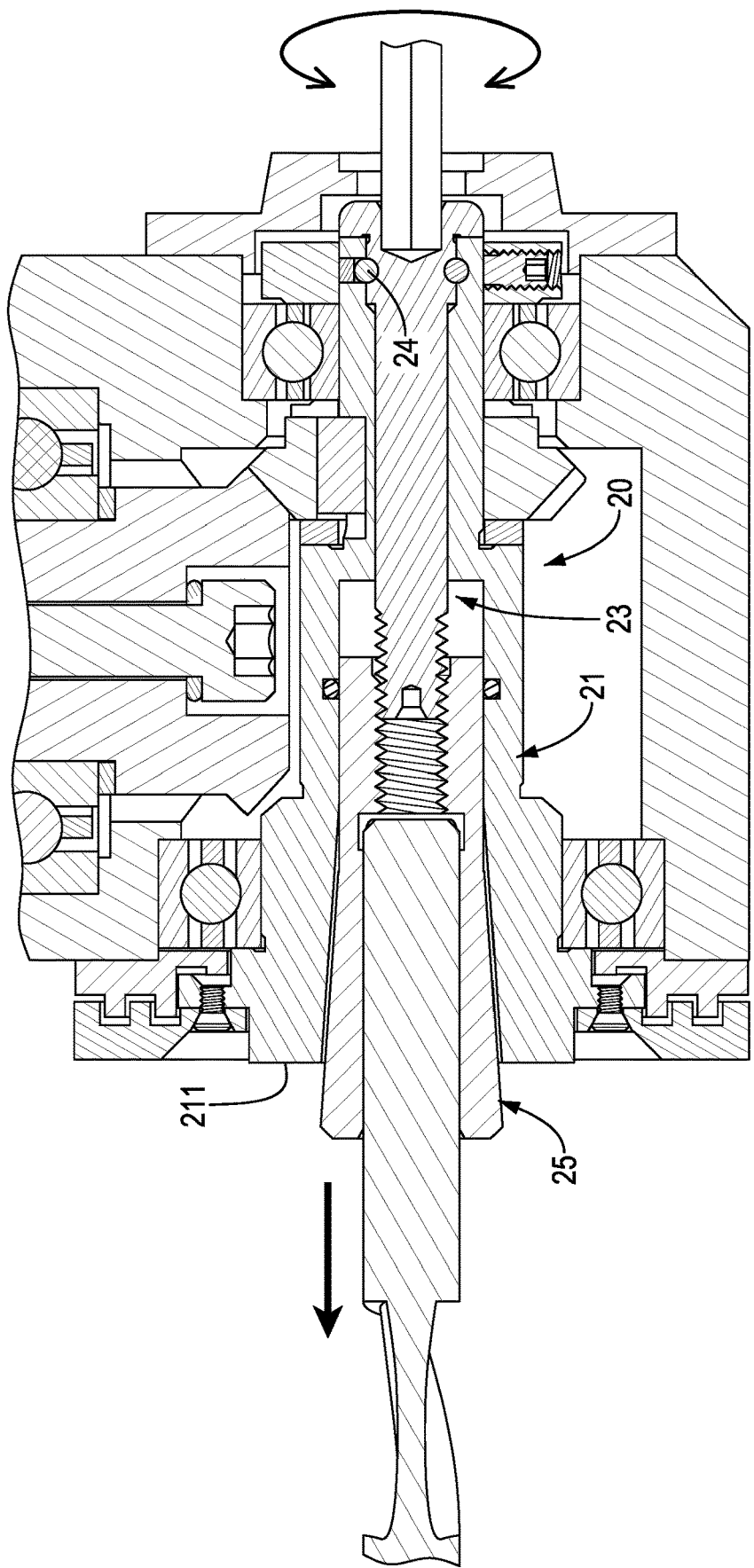
FIG. 6 is an operational cross sectional side view of the angle head holder in FIG. 4A.

With reference to FIG. 6, the balls 24 mounted between and engaged with the threaded rod 23 and the cutter spindle 21 are used to limit relative position between the threaded rod 23 and the cutter spindle 21. Then the threaded rod 23 cannot move forward or backward relative to the cutter spindle 21. The smooth rotation of the threaded rod 23 relative to the cutter spindle 21 is enhanced. When rotating the threaded rod 23, the threaded rod 23 is rotated in place. When loosening the threaded connection between the collet 25 and the threaded rod 23, the collet 25 is moved toward the front end 211 of the cutter spindle 21. The collet 25 can be detached more conveniently. The damage of the collet 25 by knocking the collet 25 is reduced.

What is claimed is:
1. An angle head holder comprising:
    a steering assembly having
        a base; and
        a driving shaft rotatably mounted in the base;
    a holder assembly rotatably mounted in the base at an angle formed between an axial direction of the holder assembly and an axial direction of the driving shaft, connected to the driving shaft with a steering transmission unit, and having a cutter spindle connected to the driving shaft with the steering transmission unit and having
    a front end;
    a rear end;
    a central hole axially formed through the cutter spindle; and
    a first annular groove radially recessed in the central hole of the cutter spindle at a position near the rear end of the cutter spindle;
a threaded rod mounted through the central hole of the cutter spindle and having
    a second annular groove radially recessed in the threaded rod and aligning with the first annular groove to form an annular ball groove between the threaded rod and the cutter spindle;
multiple balls mounted in and arranged in the ball groove; and
a collet inserted in the central hole of the cutter spindle from the front end of the cutter spindle and connected to the threaded rod with threaded connection;
wherein the cutter spindle has an inserting hole radially recessed in an outer surface of the cutter spindle and aligning with and communicating with the first annular groove of the cutter spindle, the inserting hole has a diameter larger than a diameter of each one of the balls; and a plug is mounted in the inserting hole of the cutter spindle;
wherein a tightening block surrounds the outer surface of the cutter spindle, covers the inserting hole of the cutter spindle, and has multiple abutting screws mounted in the tightening block and arranged around the tightening block at angular intervals, and the abutting screws are respectively connected to the tightening block with threaded connection and respectively abut against the outer surface of the cutter spindle.

2. The angle head holder as claimed in claim 1, wherein the plug is a flexible member.

3. The angle head holder as claimed in claim 2, wherein the threaded rod has a head and a rod body, the head is adjacent to the rear end of the cutter spindle, the rod body extends from the head toward the front end of the cutter spindle, a flange radially protrudes from the rod body at a segment of the rod body near the head, and the second annular groove is radially recessed in an outer surface of the flange of the threaded rod.

4. The angle head holder as claimed in claim 3, wherein the threaded rod has a socket recessed in an end of the head of the threaded rod.

5. The angle head holder as claimed in claim 4, wherein the angle formed between the axial direction of the holder assembly and the axial direction of the driving shaft is 90 degrees.

6. The angle head holder as claimed in claim 1, wherein the threaded rod has a head and a rod body, the head is adjacent to the rear end of the cutter spindle, the rod body extends from the head toward the front end of the cutter spindle, a flange radially protrudes from the rod body at a segment of the rod body near the head, and the second annular groove is radially recessed in an outer surface of the flange of the threaded rod.

7. The angle head holder as claimed in claim 6, wherein the threaded rod has a socket recessed in an end of the head of the threaded rod.

8. The angle head holder as claimed in claim 7, wherein the angle formed between the axial direction of the holder assembly and the axial direction of the driving shaft is 90 degrees.

* * * * *